United States Patent Office 2,741,626
Patented Apr. 10, 1956

2,741,626

HYDROXYLATED STEROIDS

Gerald D. Laubach, Jackson Heights, N. Y., assignor to Chas. Pfizer & Co., Inc., Brooklyn, N. Y., a corporation of Delaware No Drawing. Application May 10, 1954,
Serial No. 428,829

3 Claims. (Cl. 260—397.2)

The present invention is concerned with a new process of preparing valuable corticosteroid intermediates and with certain novel compounds thereby produced. This application is a continuation-in-part of application Serial No. 251,977 filed on October 18, 1951.

The introduction of an oxygen function at the 11-position of the steroid nucleus is essential in order that compounds possessing appreciable therapeutic activity, such as cortisone, may be obtained. This introduction of a C11 oxygen atom is usually accomplished through addition of various reagents to a 9(11) or 11,12-nuclear unsaturated steroid. Hence the preservation of a double bond at the 11-position, until the proper time for oxygenation, is most important. Active compounds of the cortisone series generally have a double bond, too, at the 4,5-position of the A ring. Such a double bond is commonly introduced late in the synthesis often by complex bromination and dehydrobromination reactions, particularly of a 3-keto compound. This method has obvious deficiencies and difficulties, especially in the case of compounds possessing the A:B trans (allo) ring configuration.

It has now been found that by a particular catalytic reduction of certain B ring unsaturated 5,8-steroid peroxides, selective hydroxylation at the 5-position may be obtained, while simultaneously the B ring double bond is realigned. The value of the products lies in their ability to retain this 5-hydroxylated group through various conversions of other parts of the molecule during the synthesis of cortical hormones, until the appropriate time for removal of the hydroxyl group by simple dehydration to leave a double bond at the desired 4,5-position of the nucleus. This novel method of selective reduction provides good yields of highly desirable cortisone intermediates, which are 5-hydroxylated steroids wherein a B ring double bond is also rearranged. The preparation of certain B ring steroid peroxides is described on pages 163–166 of Natural Products Related to Phenanthrene by Fieser & Fieser (Reinhold Publishing Corp., New York, N. Y. 1949)).

Broadly speaking, the new process comprises hydrogenating a 6,7-unsaturated, 5,8 steroid peroxide in the presence of a Raney nickel catalyst. The product of this catalytic reduction is a 5-hydroxyl, 7,8-unsaturated steroid. The reaction may be illustrated graphically as follows: (The formulae do not attempt to shown unsaturation, substituent groups or the like in any but the B ring.)

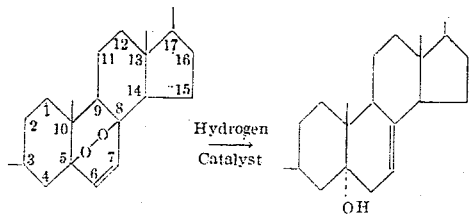

The 7,8-nuclear monounsaturated products are new compounds not heretofore known.

The process is especially useful when a steroid having a 9(11) double bond is the initial reactant. As previously mentioned, the 9(11)-unsaturation is highly desirable in cortisone synthesis. The new reducing operation is surprisingly specific and for some reason effects hydroxylation at C5 and shifting of the 6,7-bond, without attacking the 9(11)-position. Thus, according to one preferred embodiment of this invention, a 6,7, 9(11)-diunsaturated, 5,8 steroid peroxide of the general structure

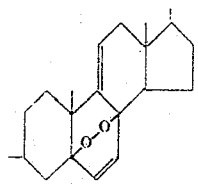

is treated with hydrogen, using Raney nickel as a catalyst, and thus converted to a 5-hydroxyl, 7,8, 9(11)-diunsaturated steroid having the formula

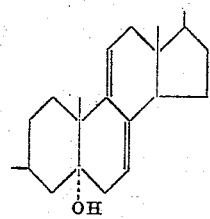

Ergosterol derivatives are particularly good examples of these 6,7-mono- or poly-unsaturated steroid reactants. Such compounds are illustrated by the general formulae given above, wherein the C10 and C13 substituents are methyl, the C3 radical is hydroxyl or a group readily hydrolyzable to hydroxyl (e. g. esters or ethers), and the C17 substituent is unsaturated alkyl,

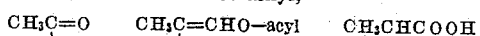

or

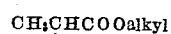

Alternatively, too, the D ring may be attached to an oxygenated ring thus:

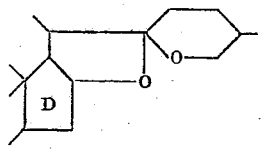

The short oxygenated C17 side chains are usually derived from ergosterol-type substituents by appropriate oxidation.

Upon reduction of a member of these groups of steroids with a Raney nickel catalyst, there is a selective reduction of the 5,8 peroxide linkage with formation of a hydroxyl group at the 5-position and a realignment of the 6,7 double bond to the 7,8-position. All this is realized without attacking a 9(11)-unsaturation or the various side chains. It will be noted that hydrogenolysis of one of the 5,8 oxygen functions occurs, but the valuable 5-hydroxyl group is retained. Such ordinarily reducible groups as a double bond in a C17 side chain are not affected. This is a most desirable feature, especially if the double bond occurs at the 22,23-position as is normally the case when ergosterols are used as starting material.

A specific embodiment of the new process which well illustrates the course of the reaction involves ergosteryl ester 5,8 peroxides, e. g. the acetate, propionate, butyrate or the like. Such a compound is dissolved in an inert organic solvent and the solution is contacted with hydrogen in the presence of a Raney nickel catalyst. A novel cortisone intermediate, the corresponding 5-hydroxyl ester, is produced. The reduction proceeds as follows (R indicates the ester group):

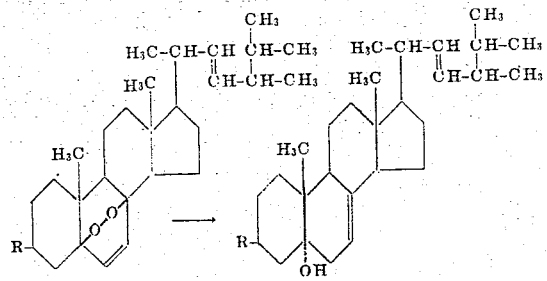

According to a second specific embodiment, a dehydroergosteryl ester 5,8 peroxide is similarly converted to the corresponding 5-hydroxyl ester. Such products are known compounds, but have never before been produced by the present novel and greatly simplified process.

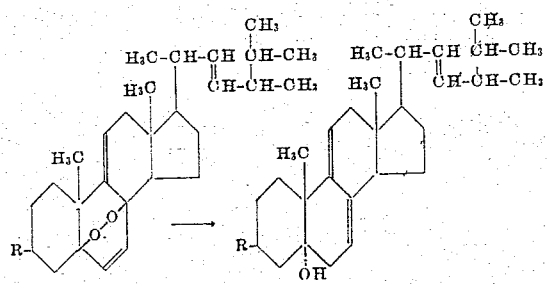

It is, of course, apparent that various other groups may be used in place of the acetoxy group at the 3-position and the alkenyl group at the 17-position of the molecule, notably those listed above in connection with the general discussion of ergosterol derivatives.

The new reduction method proceeds easily at temperatures in the order of about 15° to 35° C. and at pressures of substantially between one and six atmospheres, using a Raney nickel catalyst. The reactions generally come to a stop after absorption of approximately the theoretical amount of hydrogen for the reduction of the peroxide linkage and hydrogenolysis of the 8-hydroxyl group. The products are readily isolated by standard means and are usually of remarkably high purity. In some cases methods such as chromatography may be utilized to give a particularly pure compound. Structures of the products have been demonstrated by physical measurements, molecular rotation, and especially by ultraviolet absorption spectra. As previously indicated, it is usually preferred to conduct the reaction in an organic solvent system, dissolving the steroid peroxide in an organic medium and contacting the solution with hydrogen. Obviously, solvents which are inert to the conditions of the reduction are best employed. Ethers like diethyl ether or dioxane and lower aliphatic alcohols are quite useful.

Raney nickel is well-known and readily obtainable on the market. It may be made by treating aluminum-nickel alloys with caustic. The optimum quantity for a given reaction of this peculiarly specific catalyst is readily determinable by one skilled in the art. Conventional amounts are normally satisfactory, or say between about 5% by weight of the compound and about 5 times the weight of the compound.

In summation, then, a new method has been found for the facile reduction of certain nuclear unsaturated 5,8 steroid peroxides, which method yields valuable steroid intermediates in which a 5-hydroxyl and at least one rearranged double bond are retained. By this procedure, precursors of the vegetable steroid type are converted into intermediates which are of value for the preparation of physiologically active 3-keto 4-unsaturated steroids, such as cortisone or compound F. One group of such compounds has been thus prepared for the first time, i. e. 5-hydroxyl-7,8-monounsaturated steroids and particularly 5-hydroxyl-7,8-nuclear monounsaturated ergosterol derivatives.

The following is an outline of a typical method by which the novel products of this invention have been converted to cortisone. Taking ergosta-7,22-diene-3β,5-diol-3-acetate as the starting material, a double bond is introduced at the 9(11) position by treatment with mercuric acetate as shown in the following equation. (Of course, if this 9(11) double bond were already present in the peroxide, it would have been retained through the reduction.)

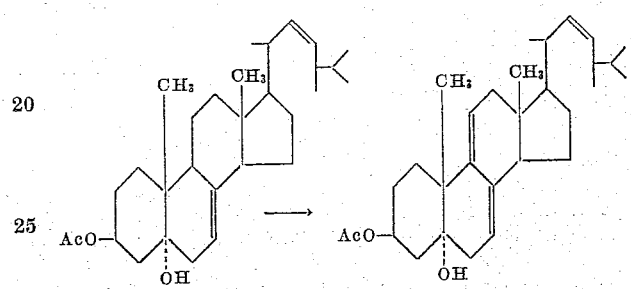

The OH group at the 5 position is then acetylated by treatment with acetic anhydride in the presence of pyridine. The acetylated compound is then treated with perbenzoic acid to introduce an epoxide group at the 9(11) position, thereby yielding the following compound.

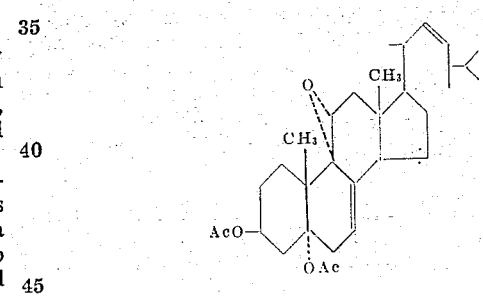

Treatment of this compound with an ether solution of boron trifluoride produces

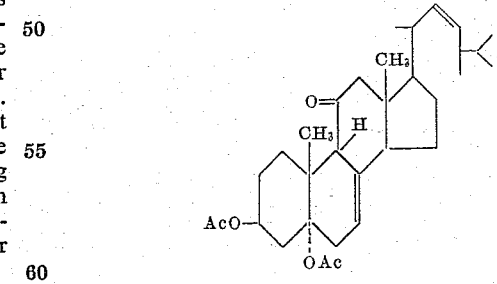

which, when subjected to hydrogenation with a palladium catalyst yields

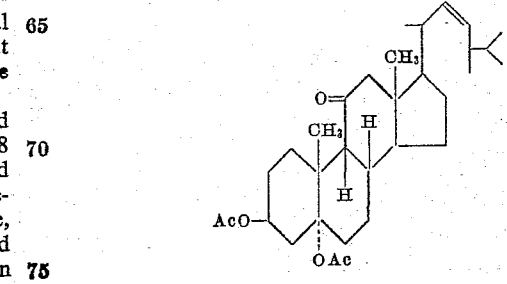

This compound undergoes epimerization upon treatment with dilute base to yield

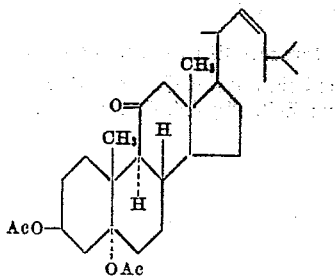

As the double bond at the 22 position has been left unchanged by these steps, the side chain is readily removed by standard methods, such as treatment with $O_3$, formation of an eneamine with pyperidine and oxidation with chromic acid to yield

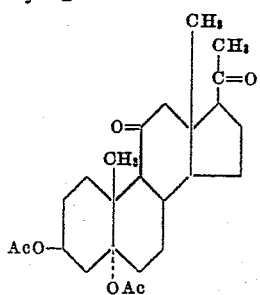

This compound is then converted by means of the well known Gallagher method to

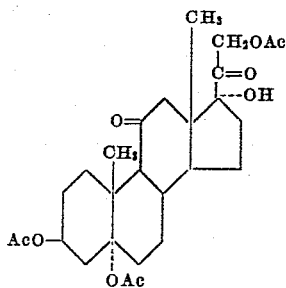

which may be selectively hydrolyzed to

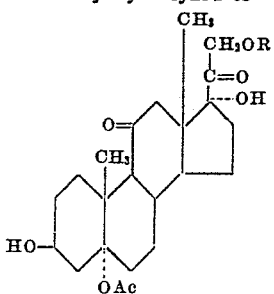

At this point the importance of having retained the hydroxyl group at the 5 position comes into play, since treatment of this compound with chromic acid readily yields

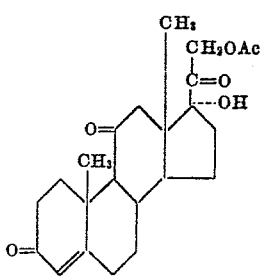

which will be recognized as cortisone acetate.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

EXAMPLE I

*Ergosta-7,22-diene-3β, 5-diol 3 acetate*

A solution of 0.470 g. (0.001 mole) of ergosteryl acetate 5,8-peroxide in 15 ml. of anhydrous peroxide-free dioxane was hydrogenated at atmospheric pressure over 0.832 g. of Raney nickel catalyst. After four hours, 48.8 ml. (99% of two moles) of hydrogen had been absorbed and hydrogen uptake ceased. A small amount of crystalline product was dissolved by addition of chloroform. The solution was filtered, concentrated and the product recrystallized from dioxane. The yield of the desired 5-hydroxyl, 7,8-nuclear monounsaturated steroid was 0.283 g. (60%) as glistening platelets, melting point 230.2–236.0° C. Recrystallization resulted in no further change in melting point. $[\alpha]_D + 0.5°$ (C, 1.04% in chloroform).

An active hydrogen determination indicated the presence of only one hydroxyl group. A 0.1856 millimole sample yielded 4.25 ml. hydrogen, which is equivalent to 0.189 millimole. Molecular rotation also established the identity of the product.

Hydrolysis readily removed the acetate group at the 3 position to yield the free alcohol. As the only other alcohol is a tertiary one, the 3 position alcohol was readily selectively converted by standard methods to a wide variety of esters and ethers having from one to ten carbon atoms inclusive in the added moiety. These groups included methyl, ethyl and benzyl among the ethers, and formate, acetate, propionate, benzoate and trimethylacetate among the esters.

EXAMPLE II

*Ergosta-7,9(11), 22-triene-3β, 5-diol 3-acetate*

A solution of 0.141 g. of dehydroergosteryl acetate 5,8-peroxide (melting point 171.6–173.0°, $[\alpha]_D + 82.5°$) in 10 ml. of peroxide-free anhydrous dioxane was hydrogenated over 0.215 g. of Raney nickel catalyst. After one hour the uptake amounted to 14.9 ml. (102% of two moles) and hydrogen absorption ceased. After dilution with chloroform and filtration, the reaction mixture was concentrated to a white crystalline solid, melting point 205–211° C. This product was determined by analyses to be the desired 5-hydroxyl,7,9(11)-nuclear diunsaturated steroid acetate. The yield was 100%. Recrystallization from ethyl acetate and then dioxane afforded well formed platelets, melting point 214.6–217.4°, $\epsilon$ max. at 242.5 m$\mu$=11,300 (log $\epsilon$=4.05).

What is claimed is:

1. A process for the conversion of an ergosteryl ester 5,8-peroxide to the corresponding 5-hydroxylated-7,8-unsaturated ergosteryl compound, which comprises contacting an inert organic solvent solution of said peroxide with hydrogen in the presence of a Raney nickel catalyst.

2. A process for the conversion of a dehydroergosteryl ester 5,8 peroxide to the corresponding 5-hydroxylated 7,9(11)-diunsaturated steroid compound, which comprises contacting an inert organic solvent solution of said peroxide with hydrogen in the presence of a Raney nickel catalyst.

3. Ergosterol derivatives of the general formula
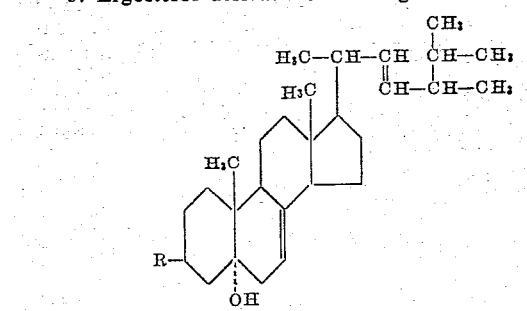
wherein R is chosen from the group consisting of hydroxyl and ester and ether groups containing from one to ten carbon atoms.
References Cited in the file of this patent
Mueller: Zeit. Physiol. Chem., 231, 75–84 (1935).
Windaus: Zeit. Physiol. Chem., 274, 206–214 (1942).